(12) United States Patent
Tamarkin (10) Patent No.: US 10,781,930 B2
(45) Date of Patent: Sep. 22, 2020

(54) GAS FIXTURE SAFETY COVER

(71) Applicant: Dawn A. Tamarkin, Stratford, CT (US)

(72) Inventor: Dawn A. Tamarkin, Stratford, CT (US)

( * ) Notice: Subject to any disclaimer, the term of this patent is extended or adjusted under 35 U.S.C. 154(b) by 0 days.

(21) Appl. No.: 16/114,656

(22) Filed: Aug. 28, 2018

(65) Prior Publication Data

US 2018/0363795 A1 Dec. 20, 2018

Related U.S. Application Data

(63) Continuation-in-part of application No. 14/854,660, filed on Sep. 15, 2015, now abandoned.

(51) Int. Cl.
| | |
|---|---|
| *F16K 35/10* | (2006.01) |
| *F16K 35/14* | (2006.01) |
| *F16K 27/12* | (2006.01) |
| *B01L 9/02* | (2006.01) |
| *F23K 5/00* | (2006.01) |
| *F23K 5/16* | (2006.01) |
| *B01L 5/00* | (2006.01) |
| *B01L 3/00* | (2006.01) |

(52) U.S. Cl.
CPC ............... *F16K 27/12* (2013.01); *B01L 9/02* (2013.01); *F16K 35/10* (2013.01); *F16K 35/14* (2013.01); *F23K 5/002* (2013.01); *F23K 5/16* (2013.01); *B01L 3/567* (2013.01); *B01L 5/00* (2013.01); *B01L 2300/041* (2013.01); *B01L 2300/045* (2013.01); *F23K 2203/101* (2013.01); *F23K 2900/05002* (2013.01); *Y10T 137/7062* (2015.04); *Y10T 137/7256* (2015.04)

(58) Field of Classification Search
CPC .......... F16K 35/00; F16K 35/10; F16K 35/14; F16K 27/12; F23K 5/002; F23K 5/16; F23K 2203/101; F23K 2900/05002; Y10T 137/7062; Y10T 137/7256; B01L 3/567; B01L 5/00; B01L 9/02; B01L 2300/041; B01L 2300/045
USPC ..... 137/382, 383, 385; 251/89, 90; 220/724; 220/725
See application file for complete search history.

(56) References Cited

U.S. PATENT DOCUMENTS

| | | | | |
|---|---|---|---|---|
| 812,021 | A * | 2/1906 | Dahl | ........................ F16K 35/10 |
| | | | | 70/180 |
| 1,668,223 | A * | 5/1928 | Utman | ..................... F16K 35/10 |
| | | | | 137/382 |
| 1,708,395 | A * | 4/1929 | Muller | ..................... F16K 35/10 |
| | | | | 137/382 |

(Continued)

FOREIGN PATENT DOCUMENTS

DE 9421505 U1 * 4/1996 ............. F16K 35/10

*Primary Examiner* — Kevin F Murphy
*Assistant Examiner* — Jonathan J Waddy
(74) *Attorney, Agent, or Firm* — Michael A. Blake (57) ABSTRACT

A gas fixture safety cover comprising: a plurality of walls, and a plurality of nozzle slots located in the walls, and plurality of handle slots located in the walls, the walls and slots configured to allow the gas fixture safety cover to slide over a gas fixture and abut a countertop if all of the gas valve handles are in an off position, and further configured to prevent the gas fixture safety cover from sliding over a gas fixture and abutting a counter top if any of the gas valve handles are in a turned on position.

4 Claims, 12 Drawing Sheets

(56) References Cited

U.S. PATENT DOCUMENTS 4,002,185 A * 1/1977 Konczal ............... F16K 27/08
  137/338
6,718,804 B1 * 4/2004 Graves ............... F16K 27/12
  137/553

* cited by examiner

GAS FIXTURE SAFETY COVER

CROSS-REFERENCES

This patent application is a continuation-in-part of U.S. patent application Ser. No. 14/854,660 by inventor Dawn A. Tamarkin entitled "GAS FIXTURE SAFETY COVER," filed on Sep. 15, 2015, and which application is fully incorporated by reference herein.

TECHNICAL FIELD

The present invention relates generally to a gas fixture safety cover, and more particularly to a gas fixture safety cover that helps prevent the unauthorized turning on of gas fixtures in class or laboratory environments; or the inadvertent leaving on of gas fixtures.

BACKGROUND

Many laboratory spaces have gas jets in them in order to use Bunsen burners. The gas valves on these gas jets should be completely in the "off" position when no Bunsen burner is in use. If the gas jets are at all open, gas could leak from them and create a safety hazard. This is particularly a problem when the gas jets are in school classrooms and students fidget with them just to have something to do. When someone smells gas as they walk near a room with gas jets, it is not obvious as to where the gas is emanating. Any one of a number of jets might have been left slightly on. In a classroom, teachers do not always find the time to check that every gas jet is fully turned off before leaving the classroom.

Currently, gas leaks are prevented by: 1) the user checking to be sure they have turned the gas valve off; 2) conscientious teacher and researcher visual inspection; 3) conscientious teacher and researcher tactile inspection; 4) master gas valve use; 5) safety caps. These means are not always effective for the reasons discussed below. The user of gas valves is not always an expert. Often, students in middle school, high school, or college are using gas jets for Bunsen burners and they do not realize that they have to turn them all the way in a particular direction to be off. Also, it is often these same individuals who play with the gas jets during their class (a form of fidgeting)—they may have no idea which position is on or off. When a conscientious teacher or researcher does a visual inspection of their laboratory, they often cannot tell whether gas jets are on or off. The position of the gas valve handle is not apparent unless a close inspection is done. That requires taking the time to walk around the room and look at each gas jet valve, which is not always convenient. When a conscientious teacher or researcher does a tactile inspection of their room, they can physically check each gas valve handle and make sure it is off. However, this is a time-consuming process, so it is rarely done.

The most common method for determining if gas is leaking is by noticing a gas smell. By the time the smell is noted, though, gas may have built up to unsafe levels.

Most rooms have a master gas valve that controls whether gas is fed to all the gas jets in the room or not. However, this master switch is usually behind a locked door to prevent tampering. Many people who run labs do not have access to the key individually, or are instructed to leave the key in a different room so that it cannot be used easily; these people typically do not use the master valve. Also, some people share rooms and have to leave the key in a place that can be accessed by all people sharing the rooms; this means that the key is not readily available and these people rarely use the master valve. As people change rooms they work in, they often no longer have access to the key, so they leave the master valve on. In addition, if only one person has the key and multiple people use the room, the master valve is often left on so that anyone coming in at a time when the key-holder is not there can still use gas. These master gas valves seem useful, but end up almost never being used on a daily or even monthly basis.

One of the gas valve manufacturers makes a safety cap, which is a small plastic piece that caps off the tip of the gas jet. The trouble with this cap is that a plumber has to install it onto the gas valve. Once a plumber has to be called, the likelihood of using this device is minimized. In addition, the caps can only be removed with a key, which causes all the problems mentioned in the prior solution (master gas valves).

Therefore there is a need for a gas fixture safety cover that overcomes the above described and other disadvantages.

SUMMARY

The disclosed invention relates to a gas fixture safety cover comprising: at least one wall; at least one handle vertical slot located in the at least one wall, and the at least one handle vertical slot extends to the bottom of the at least one wall; at least one nozzle vertical slot located in the at least one wall, and the at least one nozzle vertical slot is generally perpendicular to the at least one handle vertical slot, and the at least one nozzle vertical slot extending to the bottom of the at least one wall; where the bottom of the gas fixture safety cover is opened.

The disclosed invention also relates to a gas fixture safety cover comprising: a first wall; a second wall attached to the first wall, the second wall is at least partially and generally perpendicular to the first wall; a first handle vertical slot located in the first wall and extending to the bottom of the first wall; a first nozzle vertical slot located in the second wall and extending to the bottom of the second wall; and where the bottom of the gas fixture safety cover is opened.

In addition, the disclosed invention relates to a gas fixture safety cover comprising: a first wall; a second wall attached to the first wall, the second wall is generally perpendicular to the first wall; a third wall attached to the second wall, the third wall is generally at about a 135° angle to the second wall; a fourth wall attached to the third wall, the fourth wall is generally at about a 135° angle to the third wall, and is parallel to the first wall; a fifth wall attached to the fourth wall, the fifth wall generally perpendicular to the fourth wall and the first wall, and parallel to the second wall; a first handle first vertical slot in the first wall and extending to the bottom of the first wall; a first nozzle vertical slot in the second wall and extending to the bottom of the second wall; a central handle vertical slot in the third wall and extending to the bottom of the third wall; a second nozzle vertical slot in the fourth wall and extending to the bottom of the fourth wall; a second handle first vertical slot in the fifth wall and extending to the bottom of the fifth wall; and where the bottom of the gas fixture safety cover is opened.

The disclosed invention also relates to a gas fixture safety cover comprising: a first wall; a second wall attached to the first wall, the second wall is generally at about 135° to the first wall; a third wall attached to the second wall, the third wall is generally at about 135° to the second wall; a fourth wall attached to the third wall, the fourth wall is generally perpendicular to the third wall and is parallel to the first wall; a fifth wall attached to the fourth wall, the fifth wall generally perpendicular to the fourth wall and the first wall, and parallel to the third wall; a sixth wall attached to the fifth wall and the first wall, the sixth wall is generally at about 135° to the fifth and first walls, and is generally perpendicular to the second wall; a first nozzle vertical slot in the first wall and extending to the bottom of the first wall; a first and second handle vertical slot in the second wall and extending to the bottom of the second wall; a second nozzle vertical slot in the third wall and extending to the bottom of the third wall; a second handle vertical slot in the fourth wall and extending to the bottom of the fourth wall; a third handle vertical slot in the fourth wall and extending to the bottom of the fourth wall; a third nozzle vertical slot in the fifth wall and extending to the bottom of the fifth wall; a first and third handle vertical slot in the sixth wall and extending to the bottom of the sixth wall; and where the bottom of the gas fixture safety cover is opened.

The disclosed invention, in addition, also relates to a gas fixture safety cover comprising: a first wall; a second wall attached to the first wall, the second wall is generally at about 45° to the first wall; a third wall attached to the second wall, the third wall is generally at about 45° to the second wall and is generally perpendicular to the first wall; a fourth wall attached to the third wall, the fourth wall is generally at about 45° to the third wall and is generally perpendicular to the second wall; a fifth wall attached to the fourth wall, the fifth wall is generally at about 45° to the fourth wall and is parallel to the first all and is perpendicular to the third wall; a sixth wall attached to the fifth wall, the sixth wall is generally at about 45° to the fifth wall and is perpendicular to the fourth wall and is parallel to the second wall; a seventh wall attached to the sixth wall, the seventh wall is generally at about 45° to the sixth wall, and is perpendicular to the first and fifth walls, and is parallel to the third wall; an eighth wall attached to the sixth wall and the first wall, the eighth wall is generally at about 45° to the sixth wall and the first wall, and is parallel to the fourth wall, and is generally perpendicular to the second and sixth walls; a first nozzle vertical slot in the first wall and extending to the bottom of the first wall; a first and second handle vertical slot in the second wall and extending to the bottom of the second wall; a second nozzle vertical slot in the third wall and extending to the bottom of the third wall; a second and third handle vertical slot in the fourth wall and extending to the bottom of the fourth wall; a third nozzle vertical slot in the fifth wall and extending to the bottom of the fifth wall; a third and fourth handle vertical slot in the sixth wall and extending to the bottom of the sixth wall; a fourth nozzle vertical slot in the seventh wall and extending to the bottom of the seventh wall; a fourth and first handle vertical slot in the eighth wall and extending to the bottom of the eighth wall; and where the bottom of the gas fixture safety cover is opened.

The disclosed invention also relates to a gas fixture safety cover comprising: a first wall; a second wall attached to the first wall, the second wall is generally perpendicular to the first wall; a third wall attached to the second wall and generally perpendicular to the second wall; a fourth wall attached to the third wall and first wall, the fourth wall generally perpendicular to the third wall and first wall; a first nozzle vertical slot in the first wall and extending to the bottom of the first wall; a second nozzle vertical slot in the second wall and extending to the bottom of the second wall; where when the gas fixture safety cover can only slide down over a two nozzle and two handle gas fixture when the two handles are both turned off.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
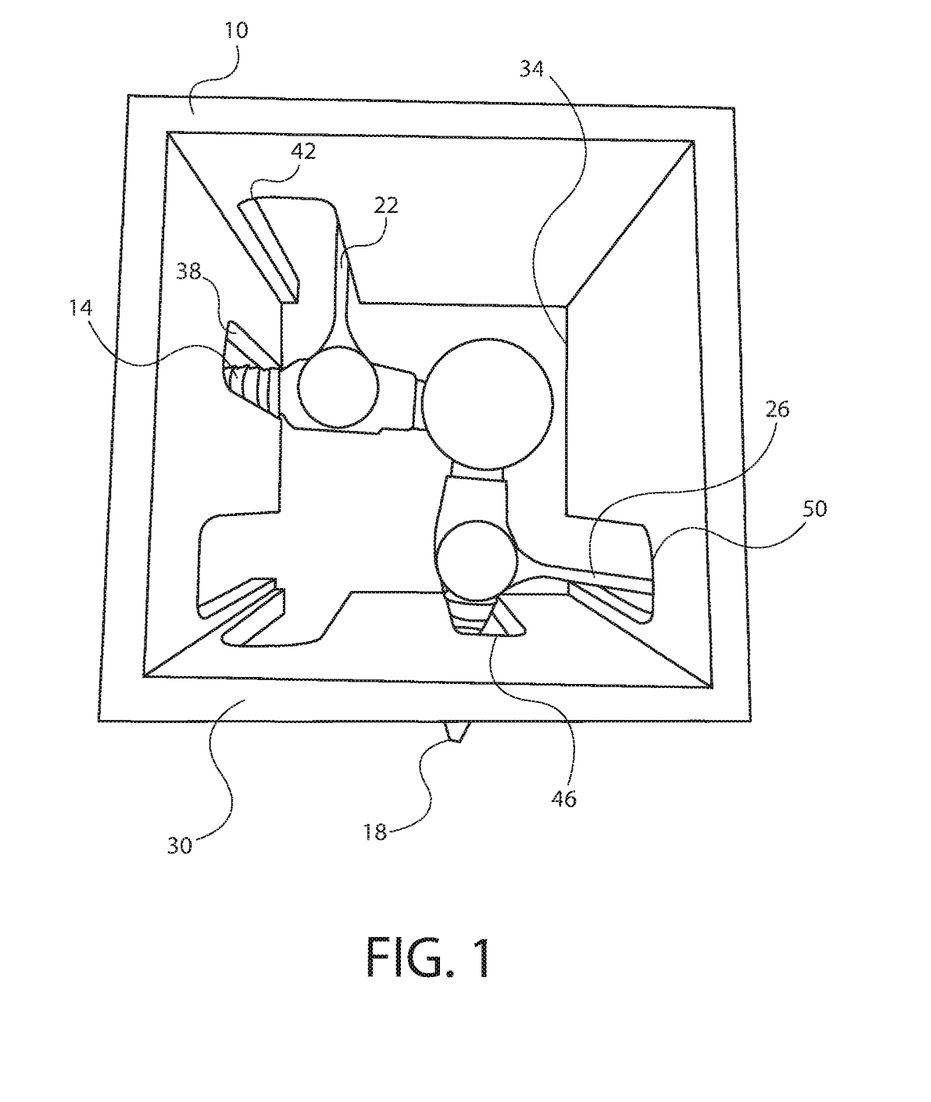
FIG. 1 is a top perspective view of one embodiment of the gas fixture safety cover.
Figure 2:
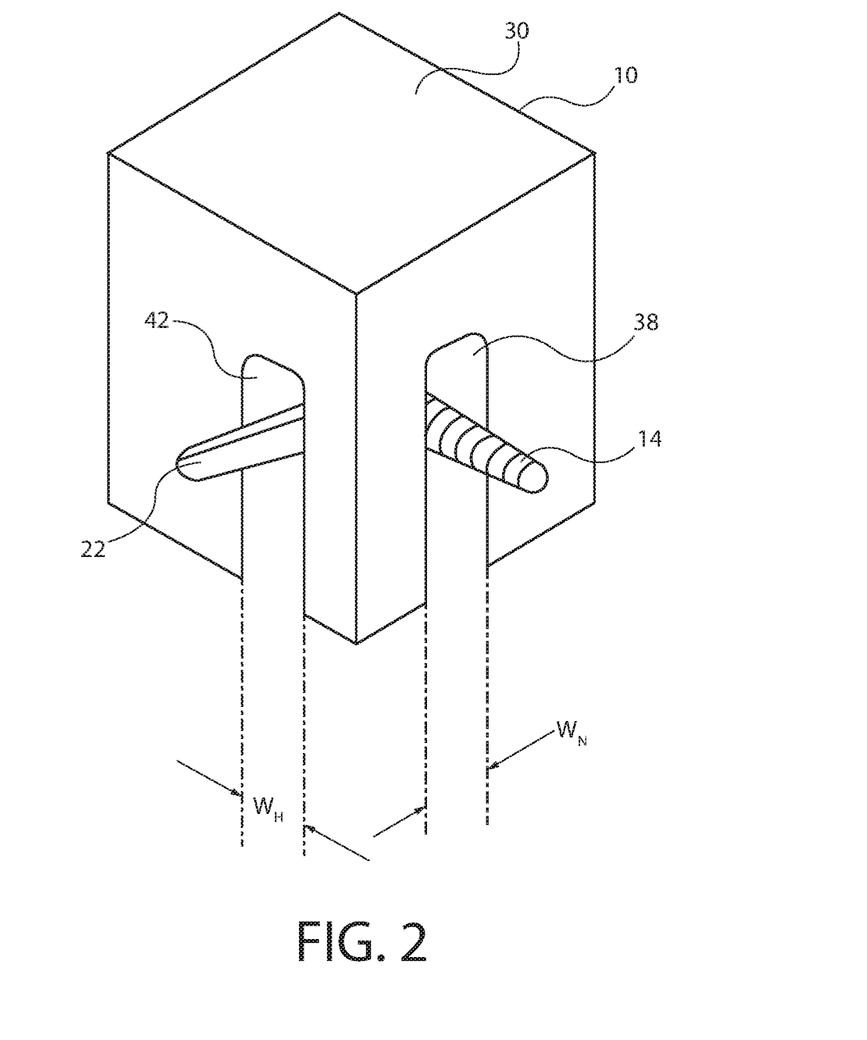
FIG. 2 is a perspective view of another embodiment of the gas fixture safety cover.

FIG. 1 shows a top perspective view of one embodiment of the gas fixture safety cover 10. In this view, the gas fixture safety cover 10 has been slid down over a first gas nozzle 14 and a second gas nozzle 18, the nozzles 14, 18 arranged in generally a 90° orientation with respect to each other. Each gas nozzle 14, 18 has a valve handle, a first handle 22 and a second handle 26. The gas fixture safety cover 10, in this embodiment, has generally a cube shape. It may have an opened top 30 in one embodiment, in other embodiments the top 30 may be closed. The gas fixture safety cover 10 will have an opened bottom 34. The gas fixture safety cover 10 has a first nozzle vertical slot 38, and a first handle vertical slot 42, and a second nozzle vertical slot 46, and a second handle vertical slot 50. FIG. 2 is a perspective view of the gas fixture safety cover 10, but in this embodiment, the top 30 is closed. In this view the first handle vertical slot 42 has a width $W_H$ and the first nozzle vertical slot 38 has a width $W_N$. $W_H$ is wide enough to allow the first handle vertical slot 42 to slide over the first handle 22 and the first nozzle vertical slot 38 to slide over the first nozzle 14 when the first handle 22 is in an "off position" The width $W_H$ is just wide enough to slide over the first handle 22, and prevent the handle 22 from being moved to a position such that any gas will be allowed to exit the first nozzle 14. The first nozzle vertical slot 38 has a width $W_N$ that is configured to allow the first nozzle vertical slot 38 to slide over the first nozzle 14. Similarly, second handle vertical slot 50 has a width $W_H$ and the second nozzle vertical slot 46 has a width $W_N$. $W_H$ is wide enough to allow the second handle vertical slot 50 to slide over the second handle 26 and the second nozzle vertical slot 46 to slide over the second nozzle 18 when the second handle 26 is in an "off position" The width $W_H$ is just wide enough to slide over the second handle 26, and prevent the handle 26 from being moved to a position such that any gas will be allowed to exit the second nozzle 18. The second nozzle vertical slot 46 has a width $W_N$ that is configured to allow the second nozzle vertical slot 46 to slide over the second nozzle 18. Thus, the geometry of the gas fixture safety cover 10 is configured such that only when the valve handles 22, 26 are in an "off position", and once the gas fixture safety cover 10 is slid over the nozzles 14, 18 and handles 22, 26, the handles 22, 26 cannot be moved or turned such that gas is released from the nozzles 14, 18.

Figure 3:
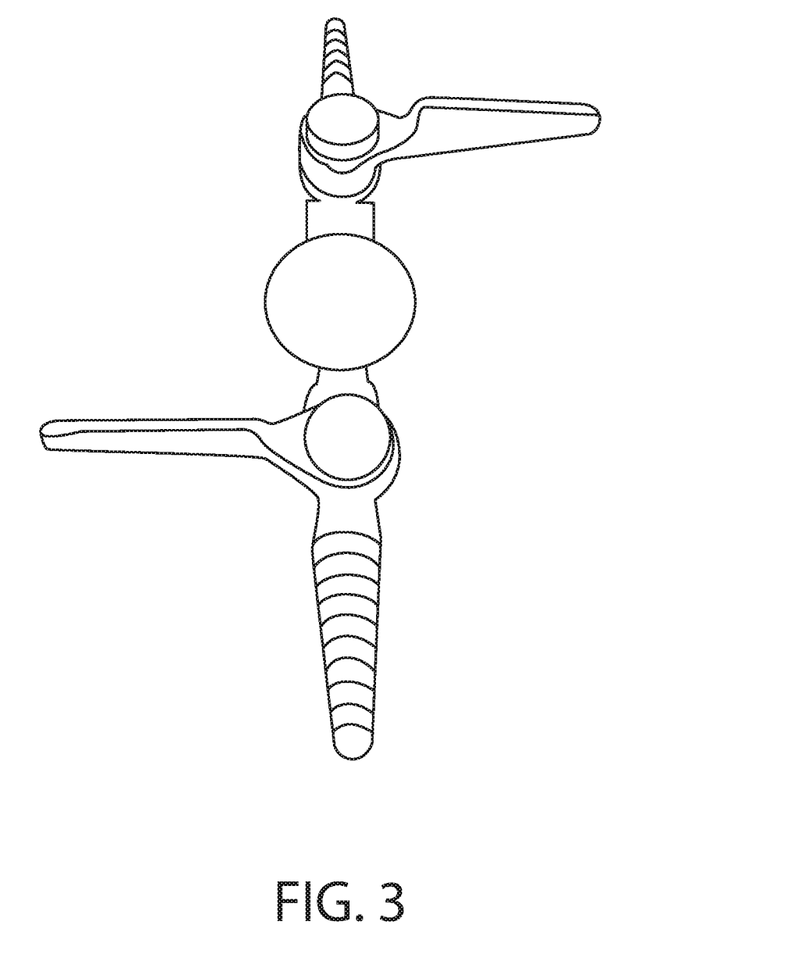
FIG. 3 is top view of two gas nozzles arranged at 180°.

The gas fixture safety cover 10 of FIGS. 1 and 2 were configured for two gas nozzles 14, 18 arranged in generally a 90° orientation to each other. However, one of ordinary skill will recognized that the gas fixture safety cover can be configured to work with a gas fixture with two nozzles and two handles arranged generally oriented at a 180° to each other as shown in FIG. 3. A gas fixture safety cover can also be configured to work with a gas fixture with a single gas jet. In addition, the gas fixture safety cover can be configured to work with a gas fixture with three gas nozzles and three handles, arranged at 90° with respect to each other, or any other suitable angle, in addition to a gas fixture with 4 gas nozzles and handles arranged at 90° to each other. In addition, the gas fixture safety cover can be configured to slide down over a water faucet and gas nozzle combination, where the gas fixture safety cover is configured to prevent the gas from being turned on when the gas fixture safety cover is slid down over the nozzle and gas valve handle. Also, a gas fixture safety cover can be configured to work with either gas fixtures that are affixed to a horizontal surface (a lab bench) or to a vertical surface (a wall or elevated extension from a lab bench). Please note that the handles of the gas fixtures are higher than the nozzles of the gas fixtures (in other words, the handles are further away from the bench or counter top than the nozzles).

Figure 4:
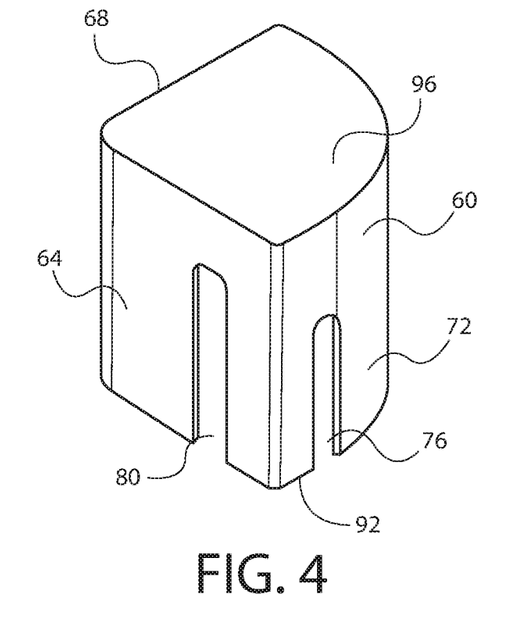
FIG. 4 is a perspective view of another embodiment of the gas fixture safety cover.

FIG. 4 shows another embodiment of the gas fixture safety cover 60. In this embodiment, the cover has a first wall 64, a second wall 68 that is generally orthogonal to the first wall 64, and a curved wall 72 attached to both the first wall 64 and 68. The gas fixture safety cover 60 may be configured to slide down onto a 2 gas nozzle system, where the 2 gas nozzles are arranged at 90° to each other. Thus, the gas fixture safety cover has a first nozzle vertical slot 76 located on the curved wall, and a first handle vertical slot 80 located on the first wall. Although not visible in this view, there is also a second nozzle vertical slot located on the curved wall, and a second handle vertical slot located on the second wall. In this embodiment, the bottom 92 of the gas fixture safety cover 60 is opened, and the top 96 is closed. The opened bottom 92 allows for the gas fixture safety cover 60 to slide over the gas nozzles and handles. Note how the first handle vertical slot 80 has a height that is higher than the first nozzle vertical slot 76. This allows for handles, when in an off position to be located in the first handle vertical slot 80, and the nozzle to be in the first nozzle vertical slot 76, while the gas fixture safety cover will abut the top surface of the lab bench or counter. On the other hand, if the handle of the gas fixture is in the first nozzle vertical slot 76, or any nozzle slot, the gas fixture safety cover will not touch or abut the top surface of the lab bench or counter. Thus when the lab instructor teacher looks around the lab, he or she will immediately notice that the gas fixture safety cover is not properly engaged with the gas fixture, and should be inspected by the teacher to make sure the gas fixture is safely turned off.

Figure 5:
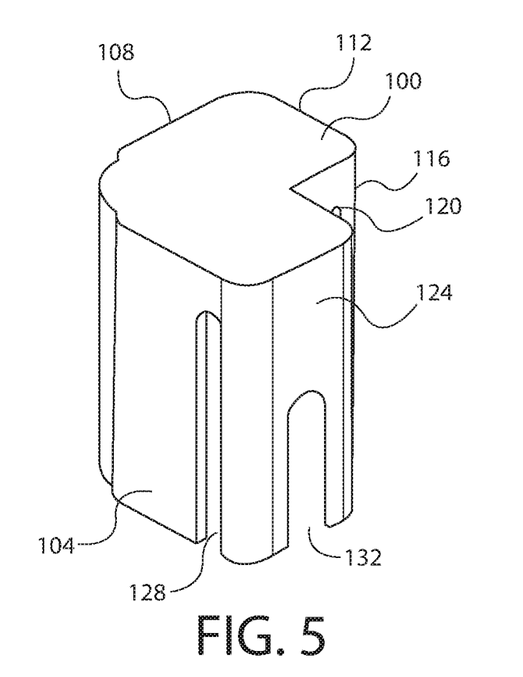
FIG. 5 is a perspective view of another embodiment of the gas fixture safety cover.
Figure 6:
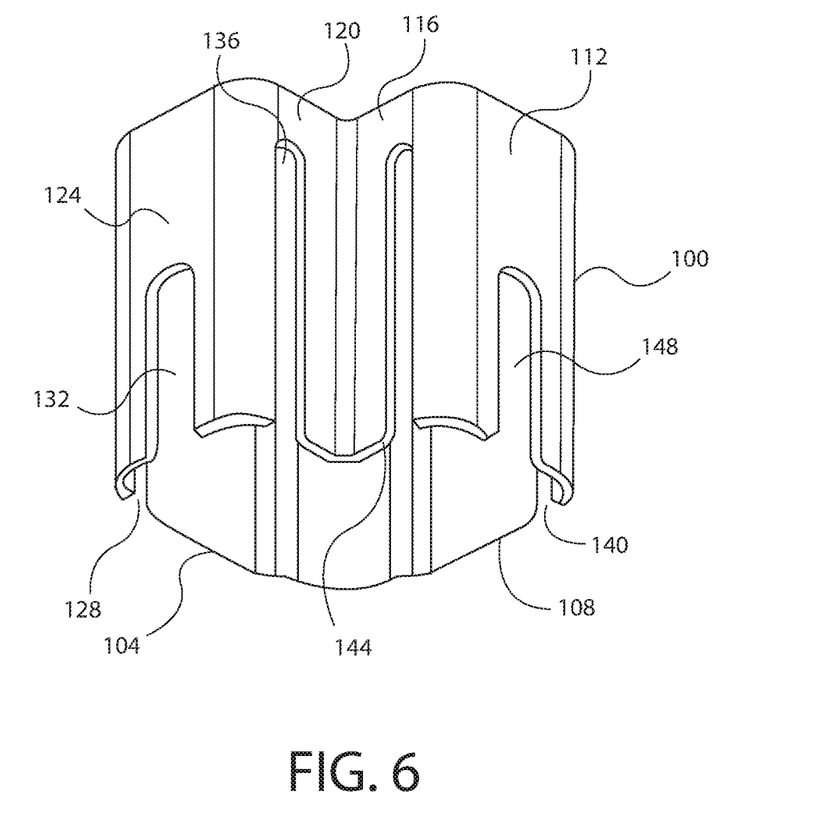
FIG. 6 is a bottom oriented perspective view of the gas fixture safety cover from FIG. 5.

FIG. 5 shows a perspective view of another embodiment of the gas fixture safety cover 100. In this embodiment, the cover 100 comprises a first wall 104, a second wall 108 in communication with the first wall and generally at 90° to the first wall 104. A third wall 112 in communication with the second wall 108, and also at 90° to the second wall, a fourth wall 116 in communication with the third wall, and also at 90° to the third wall, a fifth wall 120 in communication with the fourth wall 116, and also at 90° to the fourth wall 116; and a sixth wall 124 in communication with the fifth wall 120 and first wall 104, and at 90° to both the first wall 104 and fifth wall 120. FIG. 6 shows a perspective view of the gas fixture safety cover 100 from FIG. 5, generally looking at the fourth wall 116 and fifth wall 120 from a bottom orientation. The first wall has a first handle vertical slot 128. The sixth wall 124 has a first nozzle vertical slot 132. There is also a second handle vertical slot 136 on the fifth wall 120, not visible in this figure, but is visible in FIG. 6. In addition, there is a third handle vertical slot 140 on the second wall 108, and a fourth handle vertical slot 144 on the fourth wall 116, and a second nozzle vertical slot 148 on the third wall 112. The first handle vertical slot 128 and the second handle vertical slot 136 are configured to allow a single valve handle in one of two off positions to be located within the slots 128, 136. Many gas valve handles have two off positions, a first position, then a second position where the valve is turned about 180° from the first position, and slots 128, 136 are configured to accept either position. Similarly, third handle vertical slot 140 and fourth handle vertical slot 144 are configured to allow a single valve handle in one of two off positions to be located within the slots 140, 144. Note that the first handle vertical slot 128, second handle vertical slot 136; third handle vertical slot 140; and fourth handle vertical slot 144 have heights that are higher than the first nozzle vertical slot 132 and the second nozzle vertical slot 148. This allows for handle, when in an off position to be located in one of the handle vertical slots 128, 136, 140, 144, and the nozzle to be in one of the nozzle vertical slots 132, 148 while the gas fixture safety cover will abut the top surface of the lab bench or counter. On the other hand, if the handle of the gas fixture is in one of the nozzle slots, the gas fixture safety cover will not touch or abut the top surface of the lab bench or counter. This is because the gas fixtures generally have handles that are higher than the nozzles. This feature applies to all embodiments disclosed where the handle vertical slots have a higher height than the nozzle vertical slots.

Figure 7:
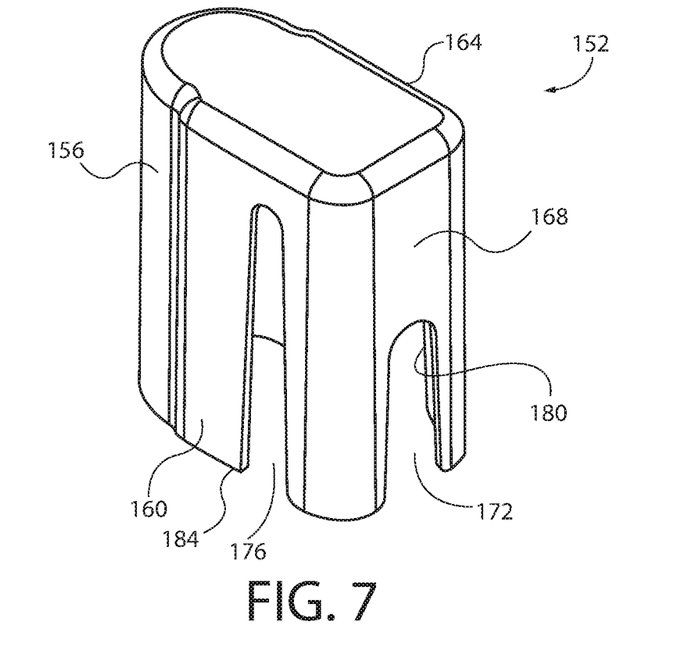
FIG. 7 is a perspective view of another embodiment of the gas fixture safety cover.

FIG. 7 shows another embodiment of the gas fixture safety cover 152. This gas fixture safety cover 152 has one curved wall 156 in communication with a first side wall 160 and a second side wall 164. The side walls 160, 164 are generally parallel to each other. The two side walls 160, 164 are in communication with a front wall 168 which is generally perpendicular to the two side walls 160, 164. The front wall 168 has a nozzle vertical slot 172. The first side wall 160 has a first handle vertical slot 176, and the second side wall 164 has a second handle vertical slot 180. The bottom 184 of the gas fixture safety cover 152 is generally open, so it can be slid down over a gas fixture. The gas fixture safety cover 152 may be configured for generally one gas jet.

Figure 8:
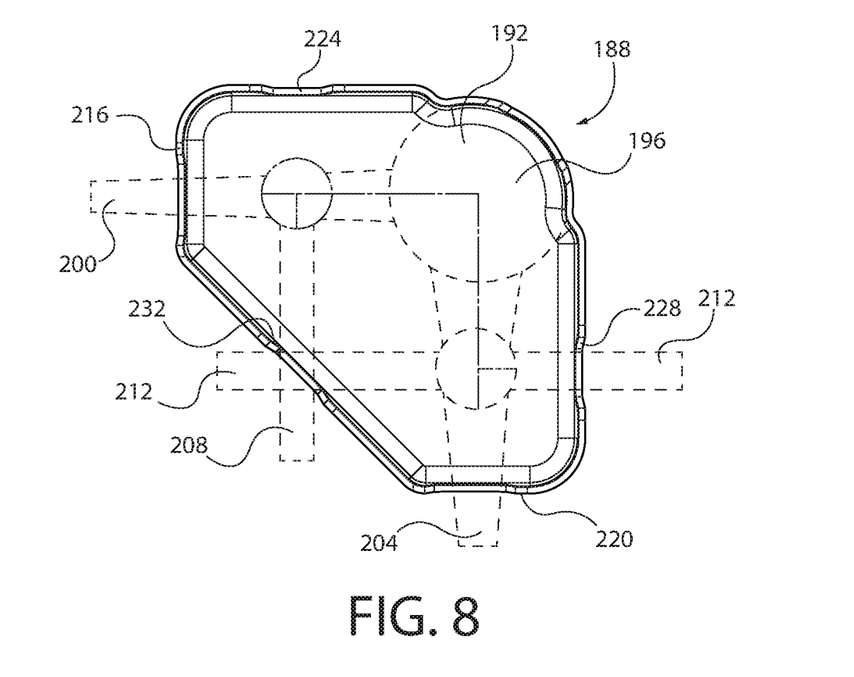
FIG. 8 is a top view of another embodiment of the gas fixture safety cover.
Figure 9:
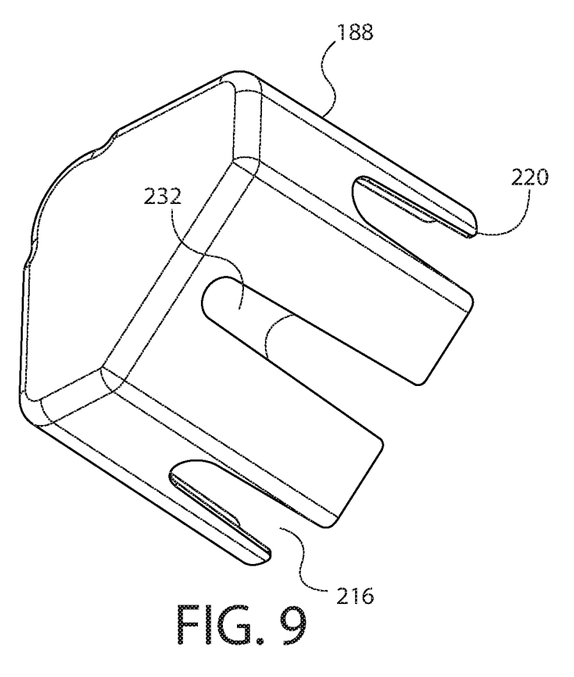
FIG. 9 is a perspective of the gas fixture safety cover from FIG. 8.
Figure 10:
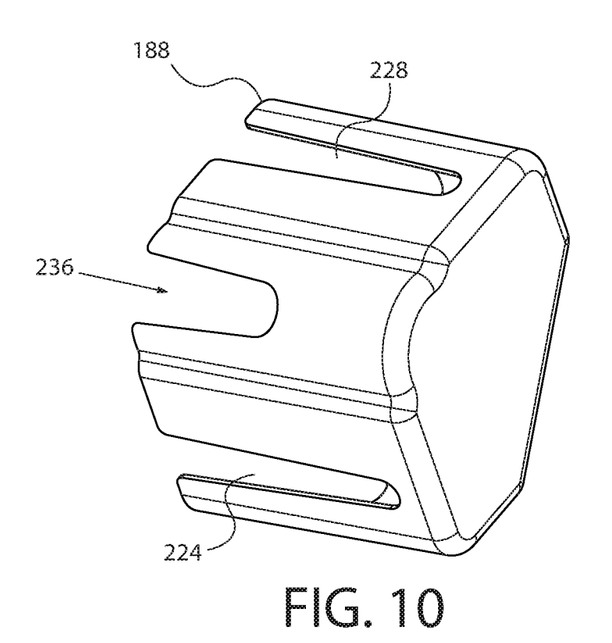
FIG. 10 is a rear perspective view of another embodiment of the gas fixture safety cover.

FIG. 8 is a top view of another embodiment of the gas fixture safety cover 188. In this view the gas fixture 192 is shown in dashed lines and comprises a gas supply 196, a first nozzle 200, a second nozzle 204, a first handle 208, and a second handle 212 shown in the two closed positions, with the first closed position 180° from the second closed position. The first nozzle 200 extends through a first nozzle vertical slot 216, and the second nozzle 204 extends through a second nozzle vertical slot 220. There is a first handle vertical slot 224, and a second handle vertical slot 228. Also, there is a central vertical slot 232 that can accept either the first handle 208 or the second handle 212. The bottom of the gas fixture safety cover 188 is generally open so it can slide over the gas fixture 192. FIG. 9 is a front perspective view of the gas fixture safety cover 188. The gas fixture safety cover 188 is generally configured to slide down over two gas jets. FIG. 10 shows a rear perspective view of the gas fixture safety cover 188. This embodiment shows an optional rear vertical slot 236. This slot 236 may be used to slide the gas fixture safety cover 188 over a wall-mounted gas fixture.

Figure 11:
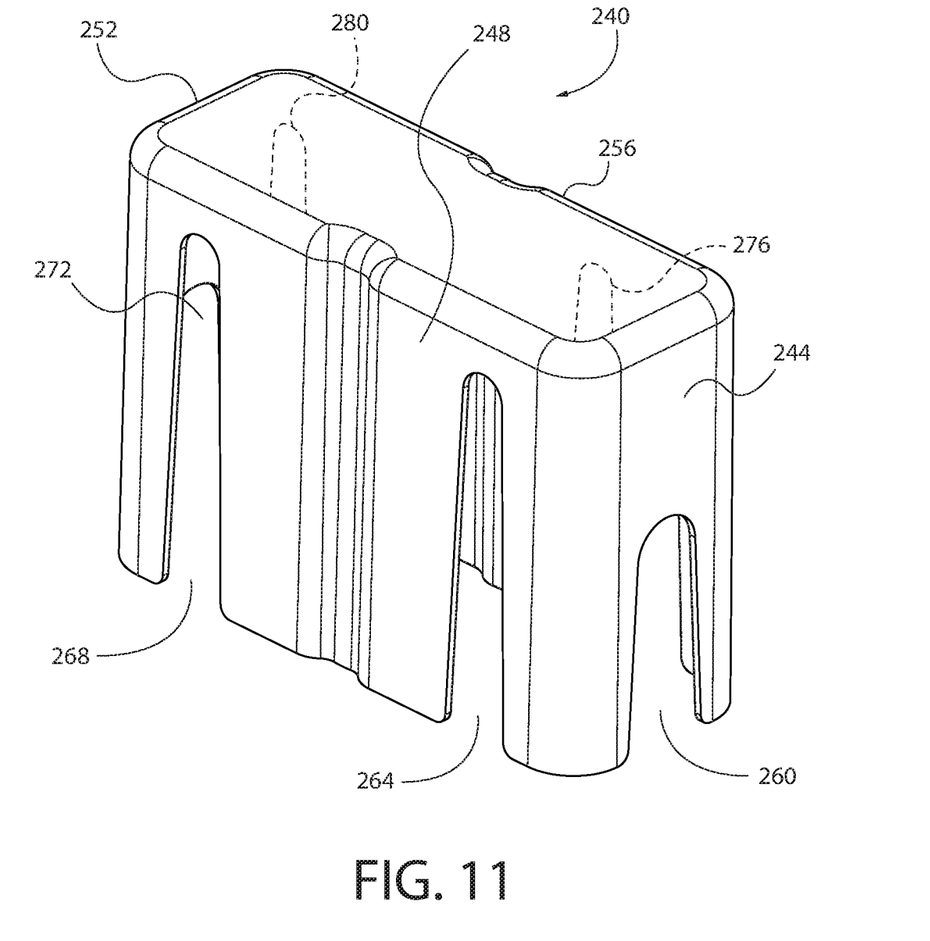
FIG. 11 is perspective view of another embodiment of the gas fixture safety cover.

FIG. 11 shows another embodiment of the gas fixture safety cover 240. This gas fixture safety cover 240 may be used with gas nozzles arranged at 180° with respect to each other. The gas fixture safety cover 240 comprises a front wall 244, a first side wall 248, a rear wall 252, and a second side wall 256. The front wall has a first nozzle vertical slot 260, the first side wall has a first handle first vertical slot 264 and a second handle first vertical slot 268. The rear wall 252 has a second nozzle vertical slot 272. The second side wall may have a first handle second vertical slot 276 and a second handle second vertical slot 280. A first handle can be in one of two off positions and fit in either the first handle first vertical slot 264 or the first handle second vertical slot 276. Similarly, a second handle can be in one of two off positions and fit in either the second handle first vertical slot 268 or the second handle second vertical slot 280.

Figure 12:
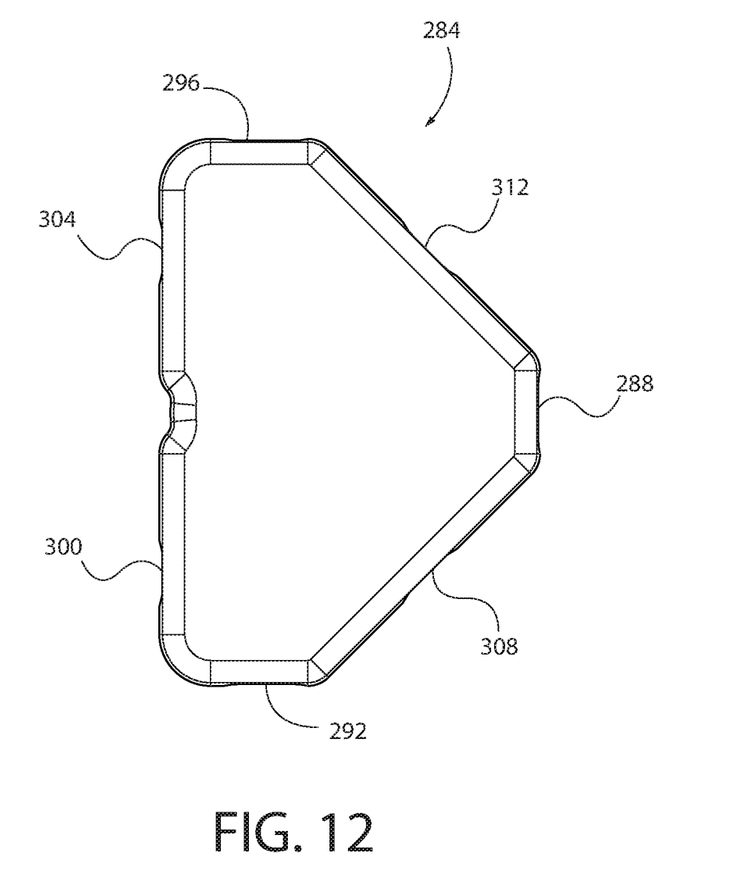
FIG. 12 is a top view of another embodiment of the gas fixture safety cover.
Figure 13:
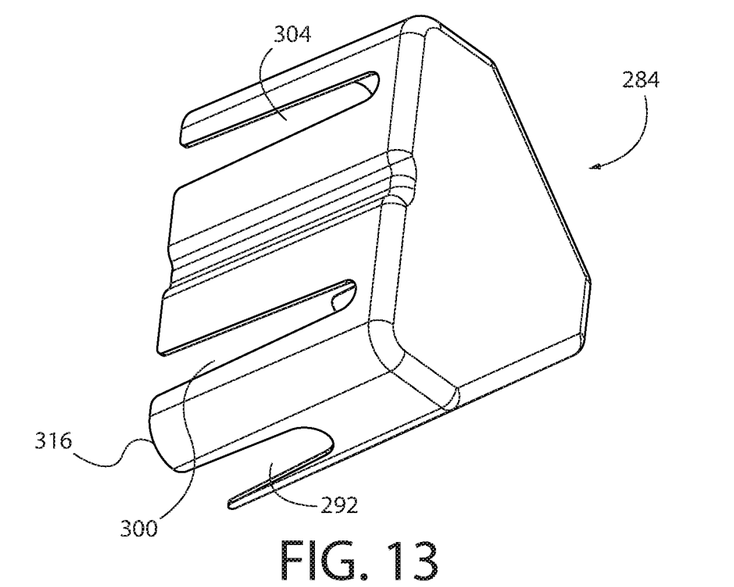
FIG. 13 is a perspective view of the gas fixture safety cover from FIG. 12.

FIG. 12 shows another embodiment of the gas fixture safety cover 284. This gas fixture safety cover 284 is configured for three gas jets. The gas fixture safety cover 284 comprises a first nozzle vertical slot 288, a second nozzle vertical slot 292, a third nozzle vertical slot 296, a second handle vertical slot 300, a third handle vertical slot 304, a first and second handle vertical slot 308, and a first and third handle vertical slot 312. The bottom 316 of the gas fixture safety cover 284 is generally opened to allow the gas fixture safety cover 284 to slide over the nozzles and handles. FIG. 13 is a perspective view of the gas fixture safety cover 284. The bottom 316 of the gas fixture safety cover 284 is generally opened to allow the gas fixture safety cover 284 to slide down over the nozzles and handles.

Figure 14:
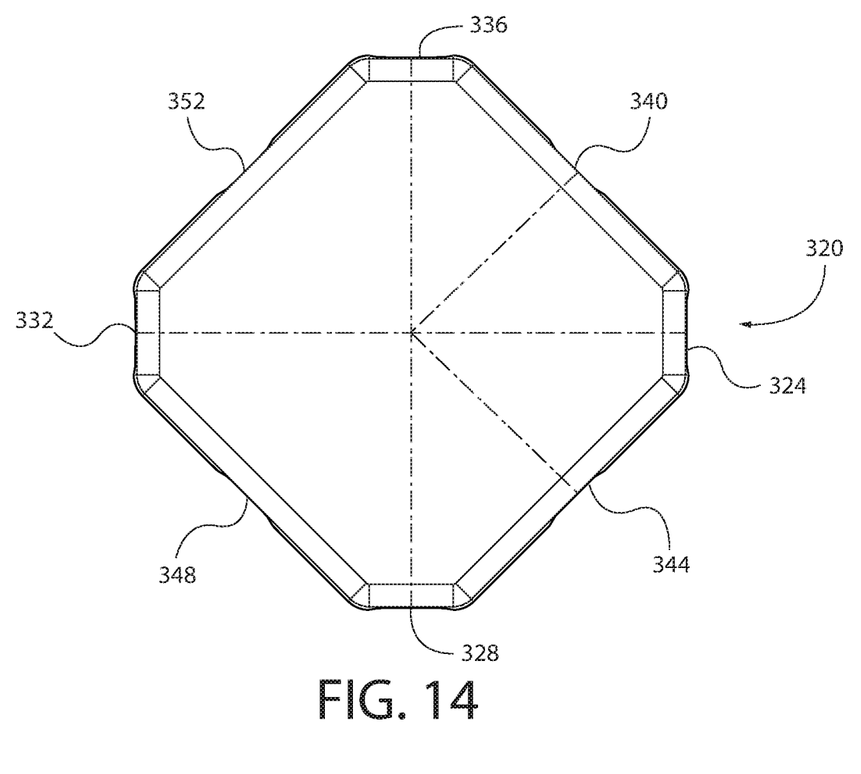
FIG. 14 is a top view of another embodiment of the gas fixture safety cover.

FIG. 14 shows a top view another embodiment of the gas fixture safety cover 320. This embodiment of the gas fixture safety cover 320 may be used with four gas nozzles, where each nozzle is generally arranged at 90° from the next adjacent nozzle. The gas fixture safety cover 320 comprises a first nozzle vertical slot 324, a second nozzle vertical slot 328, a third nozzle vertical slot 332, and a fourth nozzle vertical slot 336. The gas fixture safety cover 320 also comprises a first and fourth handle vertical slot 340, a first and second handle vertical slot 344, a second and third handle vertical slot 348, and a third and fourth handle vertical slot 352. The bottom of the gas fixture safety cover 320 is opened to allow the gas fixture safety cover 320 to slide over the four nozzles and handles.

Figure 15:
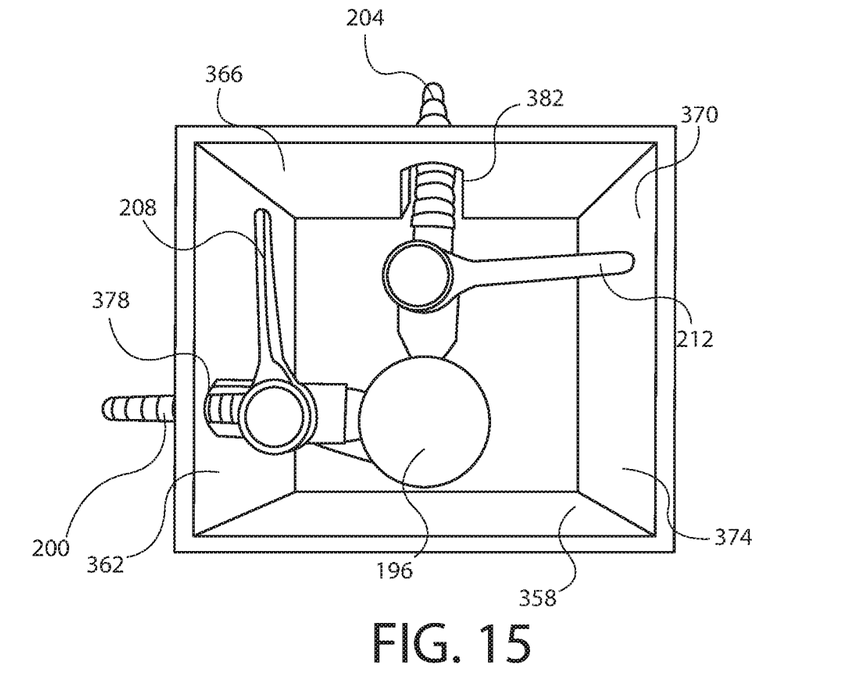
FIG. 15 is a top view of another embodiment of the gas fixture safety cover.
Figure 16:
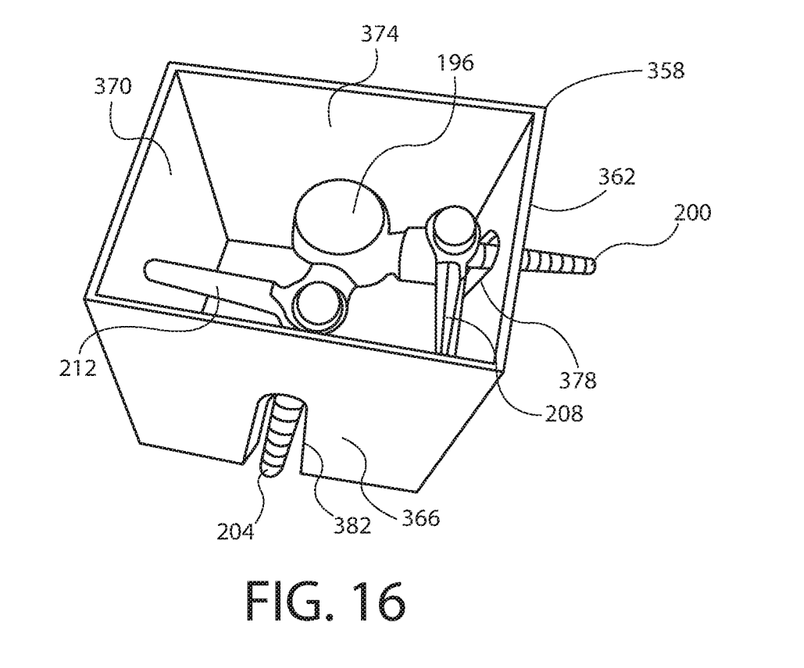
FIG. 16 is a perspective view of the gas fixture safety cover from FIG. 15.

FIG. 15 shows a top perspective view of another embodiment of the gas fixture safety cover 358. In this embodiment, the gas fixture safety cover 358 comprises a first wall 362, a second wall 366 in communication with the first wall 362, a third wall 370 in communication with the second wall 366, and a fourth wall 374 in communication with the third wall 370 and first wall 362. The first wall 362 has a first nozzle vertical slot 378, and the second wall has a second nozzle vertical slot 382. Note how there is no vertical slots for the handles 208, 212. The proximity of the walls 362, 266 prevent the handles 208, 212 from being turned on. FIG. 16 is another perspective view of the gas fixture safety cover 358.

Figure 17:
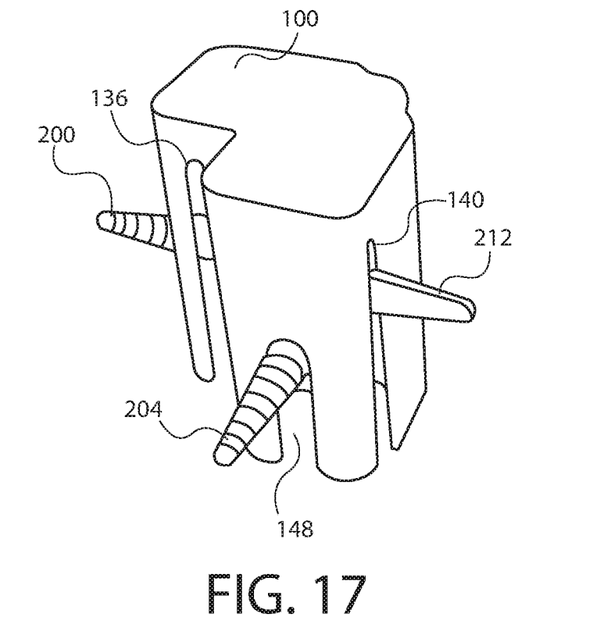
FIG. 17 is a perspective view of the gas fixture safety cover from FIGS. 5 and 6.
Figure 18:
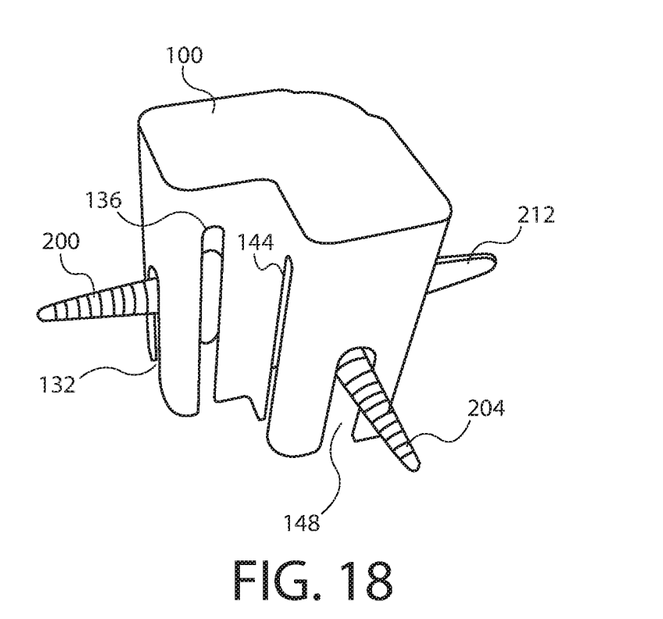
FIG. 18 is another perspective view of the gas fixture safety cover from FIG. 17.

FIG. 17 is a perspective view of the gas fixture safety cover 100 from FIGS. 5 and 6 shown slid down upon a gas fixture 192. FIG. 18 is another perspective view of the gas fixture safety cover 100 from FIG. 17.

The disclosed gas fixture safety cover can slide down over the entire gas fixture, so regardless of the number of gas jets on the fixture, only one safety cover is needed. The gas fixture safety cover does not lock into place so no key is needed. The user of the gas valve can remove the gas fixture safety cover for gas use and then replace the gas fixture safety cover after gas use; no expert is needed for cover removal or replacement. The method for placing the gas fixture safety cover on the fixture is intuitive and requires no English language skills. The gas fixture safety cover stands out visually, so its position can be detected by an expert located a distance away from the fixture within the room. Also, when the gas fixture safety cover is in place covering a gas fixture, students will not have any access to the fixture and will be unable to play with the gas fixture as a form of fidgeting.

The gas fixture safety cover can be made out of plastic, metal, wood, or any suitable material. In one embodiment, the material may be heat-resistant and able to be autoclaved (since gas fixtures are often used in microbiology and pathology labs). The gas fixture safety cover generally slides over the entire gas fixture, but only when the valves are in the "off" position. It has appropriate slots to enable it to cover the fixture with the tips of the gas jets sticking out. The gas valves generally have two "off" positions (90 degrees in either direction relative to the gas jet), and in some embodiments, the gas fixture safety cover can slide over the fixture regardless of which of the two off positions the valve is in. The gas fixture safety cover can be open or closed at the top edge. The gas fixture safety cover can be configured to fit over a variety of gas jet fixtures. Fixture options include: A fixture with a single gas jet; Two gas jets at a 90° angle position; Two gas jets at a 180° angle position; Three gas jets (at 0°, 90°, and 180° angle positions); Four gas jets (all at right angles compared to one another); Wall-mounted fixtures; Lab-bench-mounted fixtures; and Fixtures associated with water faucets. The gas fixture safety cover can slide over as many gas jets as are on a fixture, so only one is needed per fixture. The gas fixture safety cover may have an optional chain, cable, or other attachment means attaching the gas fixture safety cover to the fixture; the attachment means will not need a plumber for installation. The purpose of the attachment means is to prevent the gas fixture safety cover from moving too far away from the fixture (potentially getting lost or getting too close to the flame from the Bunsen burner). When the attachment means is attached, the gas fixture safety cover will be able to be removed and be placed adjacent to the fixture. The gas fixture safety cover may come with instructions and may be labeled to use only as instructed.

The disclosed gas fixture safety cover has many advantages. The disclosed gas fixture safety cover solves the problem of gas valves being incompletely turned off because when the gas fixture safety cover is on the fixture, the gas jet must be completely off. A quick visual inspection can ensure that all the gas jets have the gas fixture safety cover in place. No one has to walk around the room to check to make sure the gas fixtures are all off. No key is necessary. Anyone can put the gas fixture safety cover on or remove it. No one can fidget with the gas jet when the gas fixture safety cover is on it. A teacher would notice anyone removing the gas fixture safety cover during class. In addition, the gas fixture safety cover may be affixed to the gas valve fixture with an attachment means such as a chain or cable so that it will stay close to the fixture and ready for reapplication after removal. The gas fixture safety cover may be any suitable shape, including but not limited to cylindrical, cube, rectangular, triangular, etc. Also, in all of these embodiments the handle vertical slot has a higher height than the nozzle vertical slot, therefore the gas fixture safety cover will abut the lab bench or counter when installed on "off" nozzle fixtures. However, if a handle ends up in one of the nozzle vertical slots, the gas fixture safety cover will not abut the lab bench or counter, and the teacher will notice during a quick visual inspection that the gas fixture safety cover is not properly installed (because it does not abut the lab bench or counter), and the gas fixture may not be safely turned off.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A gas fixture safety cover comprising:
a first wall;
a second wall attached to the first wall, the second wall is substantially perpendicular to the first wall;
a third wall attached to the second wall, the third wall is substantially at a 135° angle to the second wall;
a fourth wall attached to the third wall, the fourth wall is substantially at a 135° angle to the third wall, and is parallel to the first wall;
a fifth wall attached to the fourth wall, the fifth wall substantially perpendicular to the fourth wall and the first wall, and parallel to the second wall;
a first handle first vertical slot in the first wall and extending to the bottom of the first wall;
a first nozzle vertical slot in the second wall and extending to the bottom of the second wall;
a central handle vertical slot in the third wall and extending to the bottom of the third wall;
a second nozzle vertical slot in the fourth wall and extending to the bottom of the fourth wall;
a second handle first vertical slot in the fifth wall and extending to the bottom of the fifth wall; and
wherein the bottom of the gas fixture safety cover is opened, and wherein the gas fixture safety cover can only slide onto a gas fixture and abut a counter top when all of a plurality of gas valve handles of the gas fixture are turned off, wherein the height of each of the handle vertical slots is higher than the height of each of the nozzle vertical slots; wherein when the gas fixture safety cover has slid onto the gas fixture when all of the plurality of gas valve handles are turned off, the gas fixture safety cover abuts the counter top; and wherein when the gas fixture safety cover has slid onto the gas fixture when one or more of the gas valve handles are turned on, the gas fixture safety cover does not abut the counter top.

2. The gas fixture safety cover of claim 1, further comprising:
a wall mounting slot located at substantially the intersection of the first and fifth walls.

3. A gas fixture safety cover comprising:
a first wall;
a second wall attached to the first wall, the second wall is substantially at a 135° angle to the first wall;
a third wall attached to the second wall, the third wall is substantially at a 135° angle to the second wall;
a fourth wall attached to the third wall, the fourth wall is substantially perpendicular to the third wall and is parallel to the first wall;
a fifth wall attached to the fourth wall, the fifth wall substantially perpendicular to the fourth wall and the first wall, and parallel to the third wall;
a sixth wall attached to the fifth wall and the first wall, the sixth wall is substantially at a 135° angle to the fifth and first walls, and is substantially perpendicular to the second wall;
a first nozzle vertical slot in the first wall and extending to the bottom of the first wall;
a first and second handle vertical slot in the second wall and extending to the bottom of the second wall;
a second nozzle vertical slot in the third wall and extending to the bottom of the third wall;
a second handle vertical slot in the fourth wall and extending to the bottom of the fourth wall;
a third handle vertical slot in the fourth wall and extending to the bottom of the fourth wall;
a third nozzle vertical slot in the fifth wall and extending to the bottom of the fifth wall;
a first and third handle vertical slot in the sixth wall and extending to the bottom of the sixth wall; and
wherein the bottom of the gas fixture safety cover is opened, and wherein the gas fixture safety cover can only slide onto a gas fixture and abut a countertop when all of a plurality of gas valve handles of the gas fixture are turned off; wherein the height of each of the handle vertical slots is higher than the height of each of the nozzle vertical slots; wherein when the gas fixture safety cover has slid onto the gas fixture when all of the plurality of gas valve handles are turned off, the gas fixture safety cover abuts the counter top; and wherein when the gas fixture safety cover has slid onto the gas fixture when one or more of the gas valve handles are turned on, the gas fixture safety cover does not abut the counter top.

4. A gas fixture safety cover comprising:
a first wall;

a second wall attached to the first wall, the second wall is substantially at a 135° angle to the first wall;

a third wall attached to the second wall, the third wall is substantially at a 135° angle to the second wall and is substantially perpendicular to the first wall;

a fourth wall attached to the third wall, the fourth wall is substantially at a 135° angle to the third wall and is substantially perpendicular to the second wall;

a fifth wall attached to the fourth wall, the fifth wall is substantially at a 135° angle to the fourth wall and is parallel to the first wall and is perpendicular to the third wall;

a sixth wall attached to the fifth wall, the sixth wall is substantially at a 135° angle to the fifth wall and is perpendicular to the fourth wall and is parallel to the second wall;

a seventh wall attached to the sixth wall, the seventh wall is substantially at a 135° angle to the sixth wall, and is perpendicular to the first and fifth walls, and is parallel to the third wall;

an eighth wall attached to the seventh wall and the first wall, the eighth wall is substantially at a 135° angle to the seventh wall and the first wall, and is parallel to the fourth wall, and is substantially perpendicular to the second and sixth walls;

a first nozzle vertical slot in the first wall and extending to the bottom of the first wall;

a first and second handle vertical slot in the second wall and extending to the bottom of the second wall;

a second nozzle vertical slot in the third wall and extending to the bottom of the third wall;

a second and third handle vertical slot in the fourth wall and extending to the bottom of the fourth wall;

a third nozzle vertical slot in the fifth wall and extending to the bottom of the fifth wall;

a third and fourth handle vertical slot in the sixth wall and extending to the bottom of the sixth wall;

a fourth nozzle vertical slot in the seventh wall and extending to the bottom of the seventh wall;

a fourth and first handle vertical slot in the eighth wall and extending to the bottom of the eighth wall; and wherein the bottom of the gas fixture safety cover is opened, and wherein the gas fixture safety cover can only slide onto a gas fixture and abut a counter top when all of a plurality of gas valve handles of the gas fixture are turned off; wherein the height of each of the handle vertical slots is higher than the height of each of the nozzle vertical slots; wherein when the gas fixture safety cover has slid onto the gas fixture when all of the plurality of gas valve handles are turned off, the gas fixture safety cover abuts the counter top; and wherein when the gas fixture safety cover has slid onto the gas fixture when one or more of the gas valve handles are turned on, the gas fixture safety cover does not abut the counter top.

\* \* \* \* \*